April 2, 1940.                I. L. CLIFFORD                2,195,918
MANUFACTURE OF ALKALI METAL HYDROXIDES FROM ALKALI METAL CHLORIDES
Filed Oct. 28, 1936
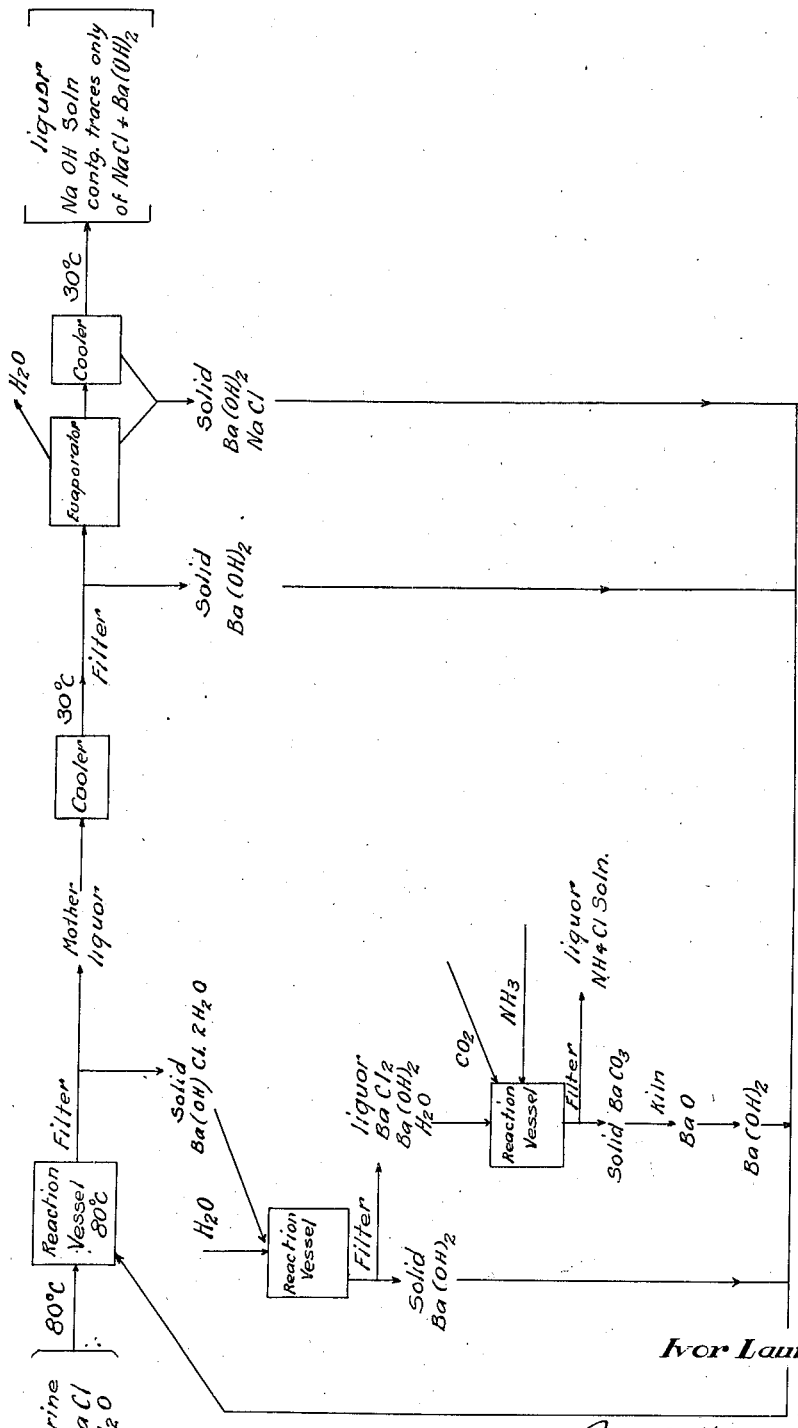
Inventor:
Ivor Laurance Clifford
By Roy F. Steward  his Attorney Patented Apr. 2, 1940

2,195,918

UNITED STATES PATENT OFFICE 2,195,918

MANUFACTURE OF ALKALI METAL HYDROXIDES FROM ALKALI METAL CHLORIDES

Ivor Laurance Clifford, Northwich, England, assignor to Imperial Chemical Industries Limited, a corporation of Great Britain Application October 28, 1936, Serial No. 108,097
In Great Britain December 13, 1935

21 Claims. (Cl. 23—185)

This invention relates to the manufacture of alkali metal hydroxides from alkali metal chlorides.

For the purpose of aiding in disclosing the invention, a flow diagram illustrating a desirable practical embodiment of the invention is given in the accompanying drawing, which will be readily understood in view of the description hereinafter set forth.

An addition compound of the formula $$BaO.BaCl_2.5H_2O$$

is, as such, known, which compound may also be written under the formula $Ba(OH)Cl.2H_2O$, and is hereinafter referred to as basic barium chloride. Also it has been stated by Schreinemakers (Zeitsch. phys. Chem., vol. 68, pp. 90–93, 1910) that the solid phases capable of existing in the system made up of the components $H_2O$, $BaO$, $Na_2O$, $BaCl_2$, $NaCl$, at 30° C. are $NaOH.H_2O$; $BaO2H_2O$; $BaO.4H_2O$; $BaO.9H_2O$; $BaCl(OH).2H_2O$; $BaCl_2.2H_2O$; and $NaCl$. Schreinemakers considered this system to be a quaternary one, being of the opinion that a reaction $2NaCl+BaO=BaCl_2+Na_2O$ would occur therein. Schreinemakers' paper suggests, therefore, that reacting $Ba(OH)_2$ and $NaCl$ would yield $BaCl_2$.

Applicant has found, however, that $NaCl$ and $BaO$ can be reacted according to the equation

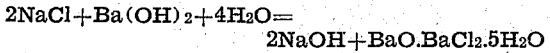

Applicant has also found that at temperatures over 40° C. the reactivity of sodium chloride in this reaction is very much greater than at normal temperatures.

Applicant has also found that at temperatures over 40° C. corresponding reactions occur between other alkali metal chlorides and barium hydroxide. Thus while at 30° C. there is no appreciable production of potassium hydroxide from potassium chloride and barium hydroxide, at an elevated temperature, e. g., 70–80° C., the reaction proceeds sufficiently in the direction of potassium hydroxide formation to enable it to form the basis of a commercial method for the manufacture of potassium hydroxide from potassium chloride.

According to the present invention, therefore, a process for the manufacture of alkali metal hydroxides from alkali metal chlorides comprises the step of reacting an alkali metal chloride with barium hydroxide in aqueous medium, at a temperature of over 40° C. and preferably between 50° C. and 100° C., to form solid basic barium chloride, which is removed from the reaction mixture.

It is advantageous to effect the reaction at a temperature between 60° C. and 80° C., the lower portion of this range being most suitable for the production of sodium hydroxide and the upper portion being most suitable for the production of potassium hydroxide. When working at such elevated temperatures the hot mother liquor from the reaction may be cooled to remove a portion of the unreacted barium hydroxide, which is returned to the reaction, after which the mother liquor may be worked up as described below.

Suitable aqueous media for use in the reaction include water, mixtures of water with suitable miscible liquids, e. g., alcohols, and solutions of suitable salts or alkaline substances (including gases such as ammonia) in the same. In suitable methanol-water mixtures it is possible to obtain higher concentrations of alkali metal hydroxide, and lower concentrations of alkali metal chloride and barium ion, in the mother liquor from the reaction than if water alone is used as the reaction medium. Such a methanol-water mixture may be obtained by incorporating the barium hydroxide in a hydrated form, e. g., $Ba(OH)_2.8H_2O$, in methanol. The barium hydroxide may be added to the reaction wholly or in part as barium oxide, which is hydrated by the aqueous reaction medium.

The mother liquor from the reaction is a solution of the alkali metal hydroxide, of concentration depending upon the reaction conditions, and containing a certain amount of unreacted chloride and barium content. For certain applications of alkali metal hydroxides, it may not be necessary to purify or concentrate this liquor, but as a rule, the liquor will be concentrated and purified to produce the substantially pure alkali metal hydroxide or a concentrated solution thereof. The preferred method of treating the liquor is to evaporate it (usually after a preliminary cooling) to remove as solids the relatively small barium content and practically all of the alkali chloride content of the liquor. In order to obtain more complete removal, it is usually preferable to employ, in place of evaporation, a combination of evaporation followed by cooling, or flash evaporation, which results in cooling, may be employed. If desired, two or more stages of evaporation and cooling may be employed, with intermediate separation of the solids. The hot mother liquor from the reaction is preferably cooled prior to evaporation, to remove a portion of the unreacted barium hydroxide and possibly also a portion of the unreacted alkali chloride, which are returned to the reaction.

A carbonation or sulphation step may be introduced at a convenient point in the working up of the mother liquor, before, during or after evaporation. (By carbonation or sulphation is to be understood the introduction of carbonate or sulphate ion in any suitable manner with the primary object of more completely precipitating the barium content of the liquor). The mother liquor from the reaction may be treated to recover separately the barium content and the alkali metal chloride content, the latter being suitably returned to the reaction. The barium content may also be returned to the reaction after conversion to barium oxide or hydroxide. Thus the mother liquor from the reaction, preferably after a preliminary cooling as described above, may be carbonated prior to evaporation, the resulting barium carbonate being calcined and returned to the process as barium oxide or hydroxide. Alternatively, the mother liquor from the reaction may be evaporated to recover the bulk of the barium content in the form of a mixture of barium hydroxide and alkali metal chloride, which is returned to the process.

The basic barium chloride produced in the reaction may, if desired, be converted, at least in part, into barium oxide or hydroxide for use again in the process. According to one suitable method, the basic barium chloride is partly converted into solid barium hydroxide by treatment with water or aqueous ammonia, whereby the basic chloride is split up into barium hydroxide, the bulk of which is obtained undissolved, and barium chloride, which is dissolved. More complete conversion is obtainable by carbonating the residual liquor, whether non-ammoniacal or ammoniacal; in the latter case (and if not already ammoniacal, the liquor may be made so, or an ammonium carbonate may be employed for the carbonation) substantially complete conversion may be obtained. The barium carbonate so precipitated is calcined, and returned as barium oxide or hydroxide to the reaction. In this way practically the whole of the barium hydroxide employed in the reaction may be rendered available for re-use. Whether the whole of it or only a portion of it is recovered for re-use will depend upon the economic conditions prevailing at the place of manufacture. Our process for the manufacture of alkali metal hydroxides can thus be conducted as a cyclic, or substantially cyclic operation.

The invention is illustrated, but not limited, by the following examples; the parts are by weight.

*Example 1*

Into a stirred reaction vessel at 80° C. are introduced 930 parts of $Ba(OH)_2.8H_2O$, 220 parts of NaCl, and 140 parts of water. From the vessel are removed, after a sufficient period of time to enable equilibrium to be attained, 565 parts of basic hydrated barium chloride corresponding to $Ba(OH)Cl.2H_2O$, and 725 parts of mother liquor made up of 100 parts of NaOH, 73 parts of NaCl, 139 parts of $Ba(OH)_2.8H_2O$ and 412 parts of water. The mother liquor thus contains 13.8% of NaOH, whereas, by way of comparison, at 30° C. the highest concentration of NaOH in the mother liquor we have been able to obtain, with water as the solvent, is about 10%. If, instead of carrying out the reaction at 80° C., a somewhat lower temperature, slightly over 60° C., is employed, it is possible, with suitable quantities of reactants, to obtain concentrations of over 20% of NaOH in the hot mother liquor; these concentrations will be further increased on cooling and separation of solid barium hydroxide.

The aforesaid 725 parts of mother liquor are cooled to 30° C., and during cooling, 116 parts of solid $Ba(OH)_2.8H_2O$ separate, yielding 609 parts of solution containing 100 parts of NaOH (corresponding to a NaOH content of 16.4%), 73 parts of NaCl, 23 parts of $Ba(OH)_2.8H_2O$ and 412 parts of water. This solution is conveniently worked up by evaporation, or by evaporation followed by cooling, when practically all the remaining $Ba(OH)_2.8H_2O$ and NaCl separate and are removed.

The separated $Ba(OH)_2.8H_2O$ and NaCl may be re-utilised in a further cycle of the process, while the hydrated barium chloride produced in the reaction may be worked up as previously described.

*Example 2*

The reactants comprise 7418 parts of barium hydroxide (reckoned as $Ba(OH)_2.8H_2O$), 2042 parts of KCl and 3442 parts of water; together with 3848 parts of wet solids—(A) and (C) referred to below—containing some 16% of mother liquor, as well as 1964 parts of $Ba(OH)_2.8H_2O$ and 1277 parts of KCl derived from the recovery operation described below. The reactants are maintained for about 2 hours at 70° C., with stirring. The complex is then filtered, whereby 7142 parts of wet solid are obtained containing 4959 parts of $Ba(OH)Cl.2H_2O$ and about 28% of adherent mother liquor. The potassium and hydroxide values can be recovered from this wet solid by washing.

9609 parts of mother liquor are obtained, containing 1091 parts of KOH, 1385 parts of KCl, 1969 parts of $Ba(OH)_2.8H_2O$ and 5164 parts of water. On cooling down to about 30° C., and filtering, 2673 parts of wet solid (A) are removed, containing 1907 parts of $Ba(OH)_2.8H_2O$, 392 parts of KCl and about 14% of mother liquor. The filtrate (6936 parts) is employed to wash certain precipitated solids—(B) referred to below—at 30° C., resulting in the production, after filtration, of 1175 parts of wet solid (C) containing 57 parts of $Ba(OH)_2.8H_2O$, 884.6 parts of KCl, and about 20% of mother liquor. The wet solids (A) and (C) are those employed in the double decomposition step described above.

The filtrate is now evaporated and subsequently cooled to 20° C., when 1000 parts of KOH are obtained in the form of 40% solution (containing also a small quantity, about 1%, of KCl) and 1345 parts of precipitated solids (B) containing 57 parts of $Ba(OH)_2.8H_2O$, 885 parts of KCl and about 30% of mother liquor, are also obtained. The solids (B) are washed as described above and eventually returned as solids (C) to the double decomposition step.

Various modifications of the procedure hereinbefore described may be made in carrying out my invention, and all such modifications are intended to come within the scope of the appended claims in so far as they achieve to a useful degree the various objects hereinbefore disclosed.

Reference is hereby made to the copending application of this applicant, Ser. No. 106,696 filed October 20, 1936, relating to the reaction of sodium chloride at temperatures below 40° C., as set forth but not claimed herein.

I claim:

1. In a process for the manufacture of alkali metal hydroxides from alkali metal chlorides, the steps which comprise reacting an alkali metal chloride with barium hydroxide in the presence of a limited amount of water, at a temperature of over 40° C., the reactants being so proportioned that solid basic barium chloride is formed, and removing such solid basic chloride from the reaction mixture.

2. A process as set forth in claim 1, in which the reaction is effected at a temperature between 50° C. and 100° C.

3. A process as set forth in claim 1, in which the reaction is effected at a temperature between 60° C. and 80° C.

4. A process as set forth in claim 1, in which the reaction is carried out in aqueous alcoholic medium.

5. A process as set forth in claim 1, in which the reaction is carried out in aqueous ammoniacal medium.

6. A process as set forth in claim 1, in which at least part of the barium hydroxide is added to said aqueous medium as barium oxide.

7. In a process for the manufacture of alkali metal hydroxides from alkali metal chlorides, the steps which comprise: (1) reacting an alkali metal chloride with barium hydroxide in the presence of a limited amount of water, at a temperature of over 40° C., the reactants being so proportioned that solid basic barium chloride is formed, and removing such solid basic barium chloride from the reaction mixture; (2) cooling the mother liquor from step (1) to separate out a portion of the unreacted barium hydroxide, removing said unreacted barium hydroxide and returning it to the reaction step (1).

8. A process as set forth in claim 7, in which in step (2) the mother liquor from step (1) is cooled to remove a portion of the unreacted barium hydroxide together with a portion of the unreacted alkali metal chloride, said portions being returned to the reaction.

9. A process as set forth in claim 7, in which the mother liquor from step (2) is evaporated to remove as solids the relatively small barium content and practically all of the alkali metal chloride content of the liquor.

10. In a process for the manufacture of alkali metal chlorides from alkali metal hydroxides, the steps which comprise: (1) reacting an alkali metal chloride with barium hydroxide in the presence of a limited amount of water, at a temperature of over 40° C., the reactants being so proportioned that solid basic barium chloride is formed, and removing such solid basic barium chloride from the reaction mixture; (2) evaporating and cooling the mother liquor from step (1) to separate out as solids the relatively small barium content and practically all of the alkali metal chloride content of the liquor, and then removing said solids.

11. A process as set forth in claim 10, in which at least two stages of evaporation are employed in step (2), after each of which the liquor is cooled and the deposited solids are removed.

12. A process as set forth in claim 10, in which flash evaporation of the liquor is employed in step (2).

13. In a process for the manufacture of alkali metal hydroxides from alkali metal chlorides, the steps which comprise: (1) reacting an alkali metal chloride with barium hydroxide in the presence of a limited amount of water, at a temperature of over 40° C., the reactants being so proportioned that solid basic barium chloride is formed, and removing such solid basic barium chloride from the reaction mixture; (2) treating the mother liquor with a member of the group consisting of carbon dioxide, sulphuric acid, and relatively soluble carbonates and sulphates, to convert a substantial portion of its barium content to solids, removing at least a portion of said solids from the mother liquor, then concentrating the remaining mother liquor by evaporation, to separate out as solids practically all its alkali metal chloride content, and removing the latter.

14. A process as set forth in claim 13, in which in step (2) the alkali metal chloride content of the mother liquor is recovered separately from the barium content and is returned to step (1) of the process.

15. A process as set forth in claim 13, in which the mother liquor from step (1) is carbonated prior to evaporation, the resulting barium carbonate is calcined and the barium compound thereby produced is returned to the process.

16. In a process for the manufacture of alkali metal hydroxide from alkali metal chlorides, the steps which comprise: (1) reacting an alkali metal chloride with barium hydroxide in the presence of a limited amount of water at a temperature of over 40° C., the reactants being present in proportions such that solid basic barium chloride is formed, and removing the said solid basic barium chloride from the reaction mixture; (2) splitting up the basic barium chloride obtained in step (1) into barium hydroxide and barium chloride by treating it with such a quantity of water that the final chloride ion concentration is below the range within which basic barium chloride can exist as a stable solid phase, and that the bulk of the barium hydroxide is undissolved, removing said barium hydroxide, and returning it for use in step (1) at a later stage of the operation.

17. A process as set forth in claim 16, in which the conversion of the basic barium chloride is effected by treatment with aqueous ammonia.

18. A process as set forth in claim 16, in which the aqueous medium remaining after the removal of solid barium hydroxide in step (2) is carbonated, the resulting barium carbonate being calcined and the barium compound thereby produced being returned to the process.

19. A process as set forth in claim 16, in which the aqueous medium remaining after the removal of solid barium hydroxide in step (2) is carbonated in the presence of ammonia, the resulting barium carbonate being calcined and the barium compound thereby produced being returned to the process.

20. In a cyclic process for the manufacture of sodium hydroxide from sodium chloride, the steps which comprise: (1) stirring together barium hydroxide and sodium chloride in the presence of a limited amount of water at a temperature of 60–80° C. for a sufficient period of time to enable equilibrium to be attained, the reactants being so proportioned that solid basic barium chloride is formed; (2) separating the solids, consisting essentially of basic barium chloride, from the reaction mixture of step (1); (3) cooling the mother liquor obtained in step (2) to a temperature of about 30° C., separating the deposited barium hydroxide and returning the same to step (1); (4) evaporating the mother liquor obtained in step (3) until the concentration of sodium hydroxide therein is approximately 50 per cent., removing deposited barium hydroxide and sodium chloride and returning the same to step (1);

(5) decomposing the basic barium chloride obtained in step (2) by stirring it with aqueous ammonia; (6) separating the solids, consisting essentially of barium hydroxide, from the reaction mixture of step (5) and returning said barium hydroxide to step (1); (7) adding $CO_2$ to the mother liquor from step (6) and separating the resulting barium carbonate; (8) calcining the barium carbonate obtained in step (7) and returning the resulting barium compound to step (1).

21. In a cyclic process for the manufacture of potassium hydroxide from potassium chloride, the steps which comprise: (1) stirring together barium hydroxide and potassium chloride in the presence of a limited amount of water at a temperature of 70–80° C. for a sufficient period of time to enable equilibrium to be attained; the reactants being so proportioned that solid basic barium chloride is formed; (2) separating the solids, consisting essentially of basic barium chloride, from the reaction mixture of step (1); (3) cooling the mother liquor obtained in step (2) to a temperature of about 30° C., separating the deposited mixture of barium hydroxide and potassium chloride and returning the same to step (1); (4) evaporating the mother liquor obtained in step (3), after using the same for washing the solids obtained by evaporation of a previous batch of mother liquor of similar composition, cooling the evaporated liquor, removing deposited barium hydroxide and potassium chloride and returning the same to step (1) after working them with a further batch of mother liquor from step (3).

IVOR L. CLIFFORD.